(12) United States Patent
Zheng et al.

(10) Patent No.: US 9,680,621 B2
(45) Date of Patent: Jun. 13, 2017

(54) MU-MIMO ACKNOWLEDGEMENT PROTOCOL EFFICIENCY

(71) Applicant: BROADCOM CORPORATION, Irvine, CA (US)

(72) Inventors: Jun Zheng, San Diego, CA (US); Nihar Jindal, Mountain View, CA (US); David Christopher Garrett, Tustin, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 451 days.

(21) Appl. No.: 14/248,220

(22) Filed: Apr. 8, 2014

(65) Prior Publication Data

US 2015/0222406 A1 Aug. 6, 2015

Related U.S. Application Data

(60) Provisional application No. 61/934,656, filed on Jan. 31, 2014.

(51) Int. Cl.
| | | |
|---|---|---|
| *H04L 1/18* | (2006.01) | |
| *H04L 5/00* | (2006.01) | |
| *H04B 7/04* | (2017.01) | |
| *H04B 7/0417* | (2017.01) | |
| *H04B 7/0452* | (2017.01) | |
| *H04B 7/06* | (2006.01) | |
| *H04L 1/16* | (2006.01) | |

(52) U.S. Cl.
CPC ......... *H04L 5/0055* (2013.01); *H04B 7/0417* (2013.01); *H04B 7/0452* (2013.01); *H04B 7/0626* (2013.01); *H04L 1/1685* (2013.01); *H04L 1/1825* (2013.01); *H04L 5/0057* (2013.01)

(58) Field of Classification Search
CPC ... H04L 1/1854; H04L 5/0055–5/0057; H04B 7/0452
See application file for complete search history.

(56) References Cited

U.S. PATENT DOCUMENTS

| | | | |
|---|---|---|---|
| 2010/0248635 A1 | 9/2010 | Zhang et al. | |
| 2012/0044925 A1* | 2/2012 | Lee | H04L 27/2602 370/338 |
| 2013/0107916 A1* | 5/2013 | Liu | H04B 7/0452 375/219 |
| 2014/0233478 A1* | 8/2014 | Wentink | H04L 5/0055 370/329 |
| 2014/0241168 A1* | 8/2014 | Merlin | H04L 1/0003 370/241 |
| 2014/0241240 A1* | 8/2014 | Kloper | H04W 16/28 370/328 |

(Continued)

*Primary Examiner* — Marcus R Smith
(74) *Attorney, Agent, or Firm* — McDermott Will & Emery LLP

(57) ABSTRACT

A method for improving multiple-user (MU) multiple-input-multiple-output (MIMO) acknowledge (ACK) protocol efficiency includes: receiving a sounding frame from a device, sending a feedback response, which includes quantized channel state information (CSI) to the device, receiving an MU physical-layer protocol data unit (PPDU) frame from the device, and in response to receiving the MU PPDU frame, sending an ACK frame to the device without receiving a polling frame prior to the ACK frame.

20 Claims, 7 Drawing Sheets

(56) References Cited

U.S. PATENT DOCUMENTS

2015/0131517 A1\* 5/2015 Chu .................... H04W 72/005
    370/312
2016/0173179 A1\* 6/2016 Zhang ................. H04B 7/0456
    370/329

\* cited by examiner

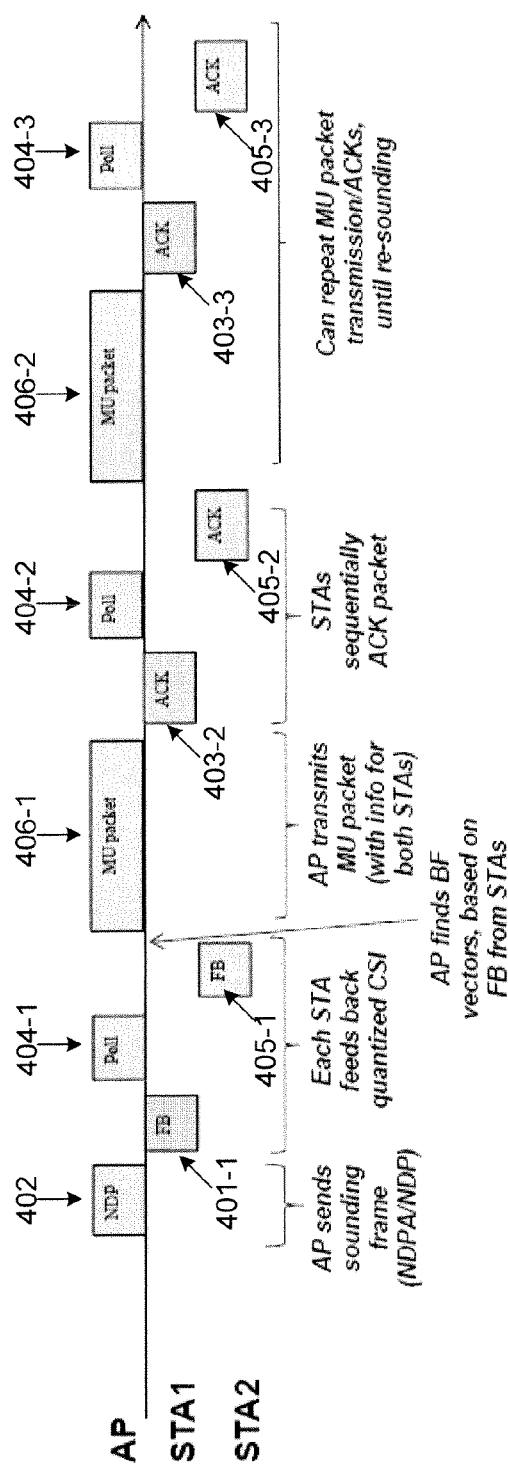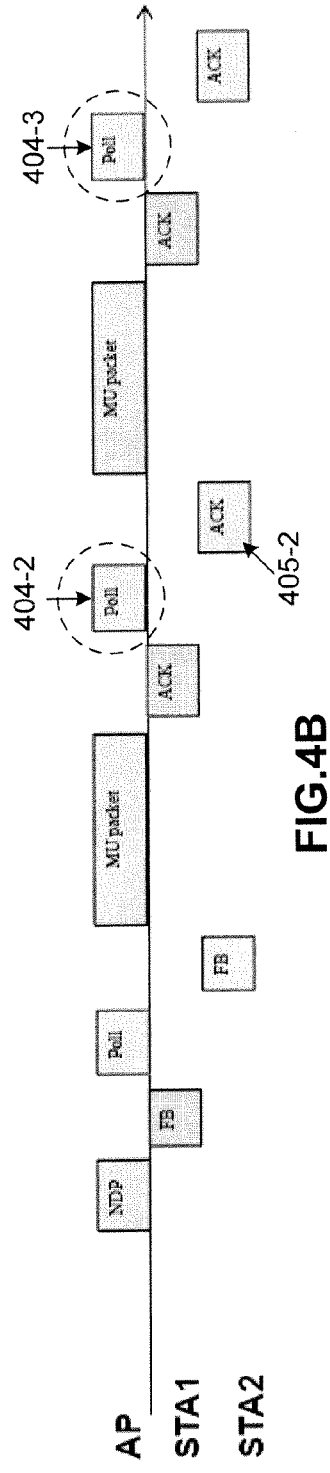
FIG.4A
FIG.4B

MU-MIMO ACKNOWLEDGEMENT PROTOCOL EFFICIENCY

CROSS-REFERENCE TO RELATED APPLICATIONS

This application claims the benefit of priority under 35 U.S.C. §119 from U.S. Provisional Patent Application 61/934,656 filed Jan. 31, 2014, which is incorporated herein by reference in its entirety.

TECHNICAL FIELD

The present description relates generally to power supplies, and more particularly, but not exclusively, to improving multiple-user (MU)-multiple-input-multiple-output (MIMO) acknowledgement (ACK) protocol efficiency.

BACKGROUND

In radio-frequency (RF) communications, multiple-input-multiple-output (MIMO) refers to using multiple antennas at both the transmitter and the receiver ends to enhance communication performance. The terms input and output in MIMO denote the radio channels that carry the input and output signals received by or transmitted from a communication device (e.g., a transceiver). MIMO, which is an important portion of modern wireless communication standards such as IEEE 802.11n (e.g., Wi-Fi), 4G, 3GPP Long Term Evolution (LTE), IEEE 802.16e (e.g., WiMAX), and others, can significantly increase data throughput and link range without the need for additional bandwidth or increased transmission power. Three main categories of MIMO include spatial multiplexing, diversity coding, and precoding.

MU-MIMO, which is part of the IEEE 802.11ac standard, allows a beamformer (e.g., a router such as an access point) to simultaneously transmit multicast data to more than one beamformees (e.g., stations such as an iPhone). In contrast to single user (SU-MIMO), where at a given time on a given channel the access point is only able to communicate to one station, the data rate is usually limited by the number of receive antennas at the station (e.g., due to size limitations of a mobile device). MU-MIMO, on the other hand, is able to fully utilize the spatial degrees of freedom and allows the access point to communicate to more than one station on the same channel at the same time. This could potentially scale the system throughput by N folds, where N is proportional to the number of transmit (TX) antennas of the access point divided by the number of receive (RX) antennas on the station. MU-MIMO technology is developed based on a set of frame exchange protocols which allows the beamformer (e.g., access point) and the beamformees (e.g., stations) to keep high data transmission without collisions. However, it's also costly to follow the existing primitive form of the frame exchange protocol that is highly inefficient.

BRIEF DESCRIPTION OF THE DRAWINGS

Certain features of the subject technology are set forth in the appended claims. However, for purpose of explanation, several embodiments of the subject technology are set forth in the following figures.

FIG. 4A illustrates an example of an MU-MIMO frame exchange.

FIGS. 4B, 4C, and 4D illustrate examples of an MU-MIMO frame exchange with improved protocol efficiency in accordance with one or more implementations.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

The subject technology may provide methods and implementations for improving multiple-user (MU) multiple-input-multiple-output (MIMO) protocol efficiency by significantly modifying the existing MU-MIMO frame exchange protocol to achieve better MAC efficiency, which further leads to better MU-MIMO system throughput. In one or more implementations, the subject technology can improve the MU-MIMO ACK protocol efficiency by eliminating sending polling frames from a MU-MIMO beamformer (e.g., a router such as an access point). In some implementation, the disclosed solution improves ACK protocol efficiency by further eliminating sending ACK frames from the stations (e.g., stations, such as cell phone, laptop, tablets, personal computers, etc.).

Figure 1:
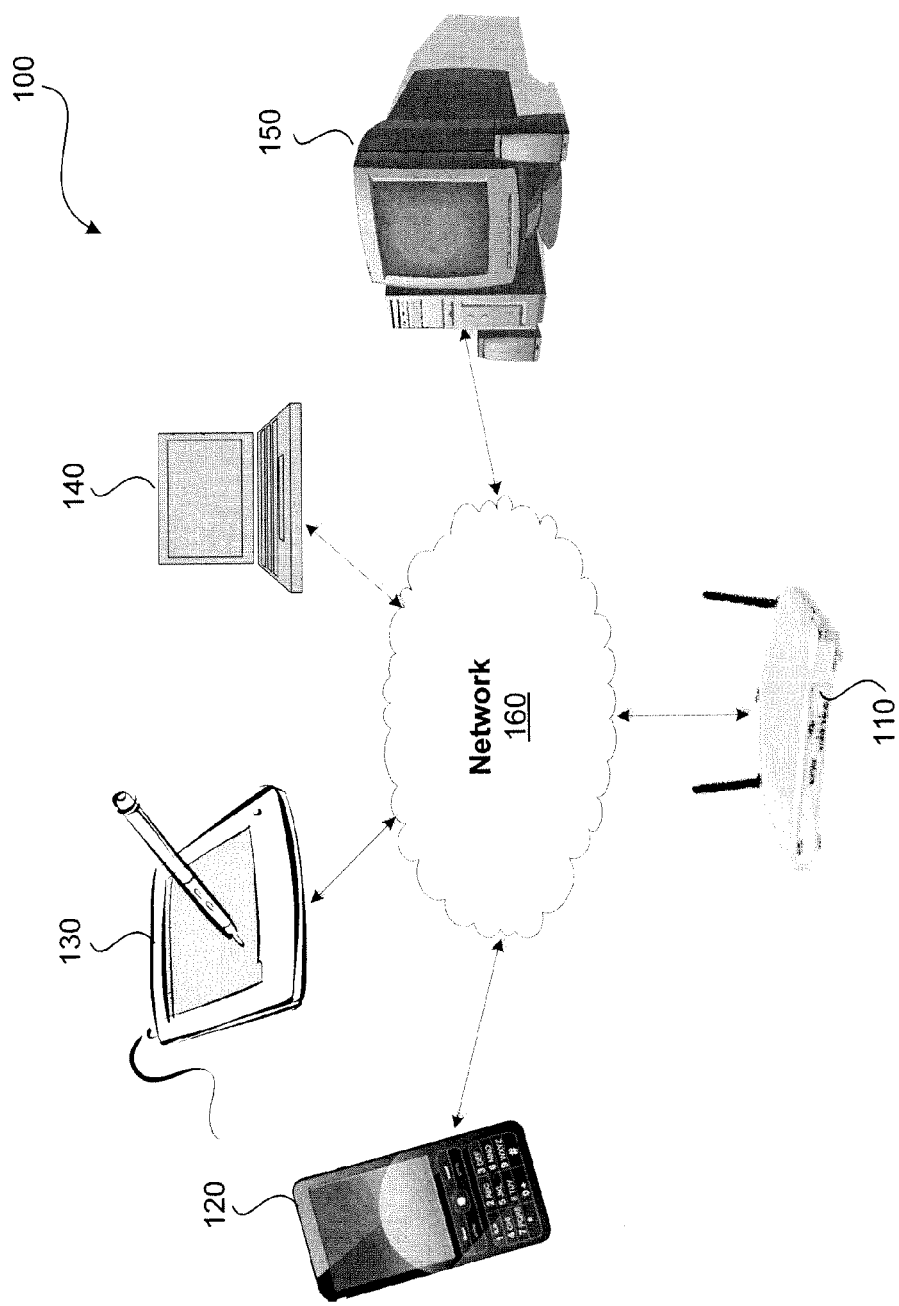
FIG. 1 illustrates an example of a network environment with improved multiple-user (MU)-multiple-input-multiple-output (MIMO) protocol efficiency in accordance with one or more implementations.

FIG. 1 illustrates an example of a network environment 100 with improved multiple-user (MU)-multiple-input-multiple-output (MIMO) protocol efficiency in accordance with one or more implementations of the subject technology. The network environment 100 includes a router 110 (e.g., an access point, such as MU-MIMO beamformer) and a number of stations (e.g., an MU-MIMO beaformee), for example, a hand-held communication device 120, a tablet 130, a laptop 140, or a personal computer 140, communicating via a network 160. The network 160 can be a local area network (LAN), a Wide area network (WAN), a personal area network (PAN), the Internet, or of any other type of network.

In one or more implementations, the router 110 receives a feedback response form a device (e.g., a station, such as the hand-held communication device 120), in response to sending a sounding frame to the station. The feedback response includes quantized channel state information (CSI). The router 110 subsequently sends an MU physical-layer protocol data unit (PPDU) frame to the station, and in response, receives an ACK frame from the station. The station sends the ACK frame without receiving a polling frame prior to sending the ACK frame. In some aspects, the station does not send an ACK response when a frame is successfully received from the router 100. Instead, the station determines that the corresponding communication channel is unreliable and, in response to the determination, sends a negative-ACK (NACK) frame to the router 110 to indicate a frame loss or a frame error.

In some implementations, the sounding frame includes multiple fields including a first field, which comprises a very-high throughput (VHT)-SIGA field. The station sends the ACK frame, without receiving a polling frame from the router 110, based on an ordering specified in the VHT-SIGA field of the MU PPDU frame. The ordering defines for each station of the multiples stations (e.g., 120, 130, 140, and 150) an order based on which each station is expected to send the ACK frame to the router 110, in response to receiving the MU PPDU frame. In some aspects, the station may use ACK frame information including a duration time of the ACK frame and a short-interval-frame-spacing (SIFS). The ACK frame information can be obtained from some MAC layer management frame exchange prior to the current transmission, so that the information can be shared among the router 110 and multiple stations under the MU context.

In some implementations, as explained above, in order to avoid polling and ACK frame overhead, the station does not send an ACK frame when the station receives the MU PPDU frame successfully. The router 110, upon not receiving ACK frames from the stations, can imply that the MU PPDU frames are received successfully. Each station may use over-the-air detection of the medium (e.g., the current communication channel). If the station needs to transmit a NACK frame, it responds with the NACK frame at the earliest possible transmission opportunity. There can still be chances that a NACK frame gets lost or is not received by the router 110 successfully. In this case, the upper layer protocols are relied upon for recovering of the lost NACK frame, which may happen in very low probabilities.

Figure 2:
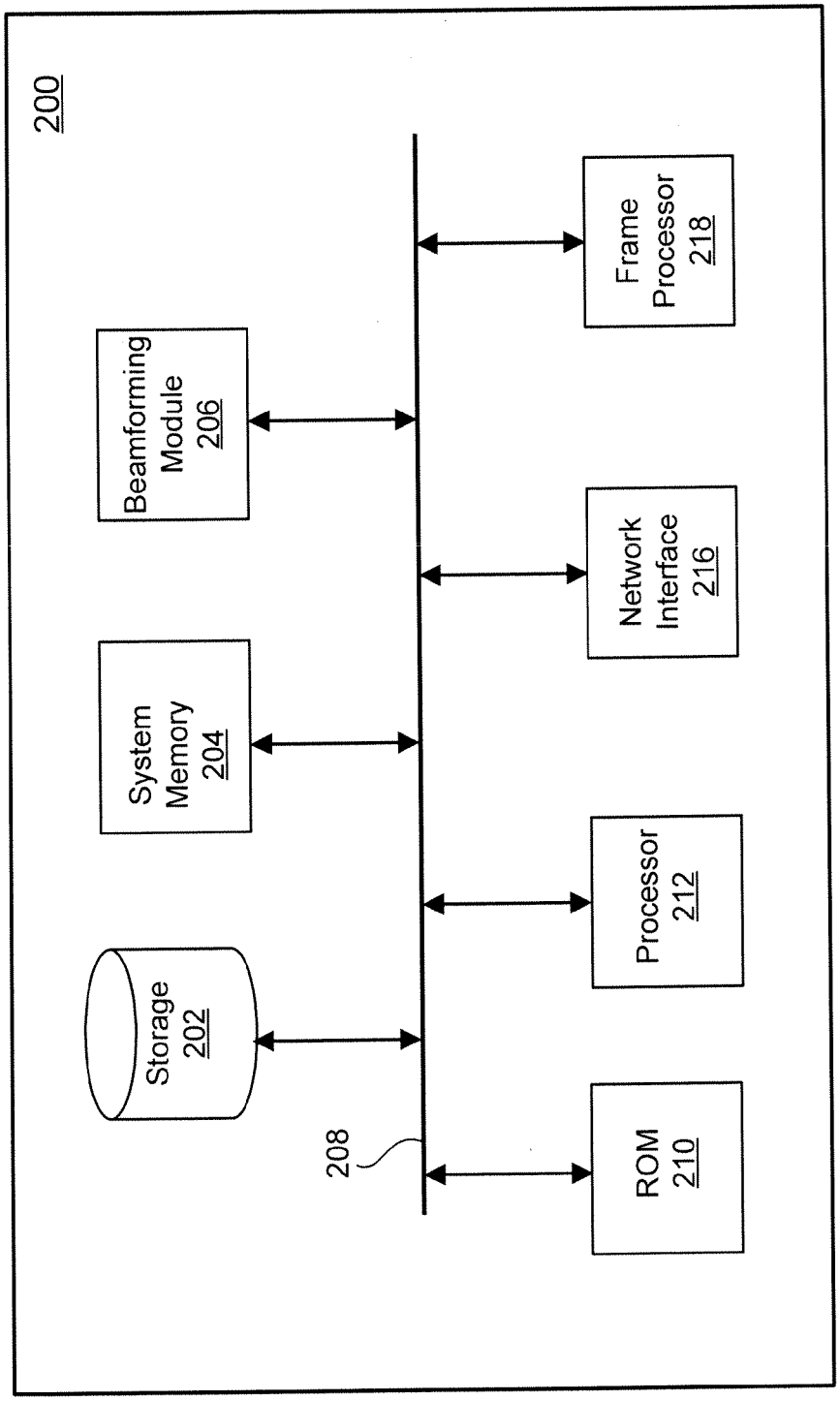
FIG. 2 conceptually illustrates an example of a router with improved MU-MIMO protocol efficiency in accordance with one or more implementations.

FIG. 2 conceptually illustrates an example of a router 200 with improved MU-MIMO protocol efficiency in accordance with one or more implementations of the subject technology. The router 200 is the same as the router 110 of FIG. 1 and is in communication with a number of stations (e.g., 120, 130, 140, or 150 of FIG. 1) via a network (e.g., 160 of FIG. 1). In one or more implementations, the router 200 includes a bus 208, a permanent storage device 202, a system memory 204, a beamforming module 206, a read-only memory (ROM) 210, processing unit(s) 212, a network interface 216, a frame processor 218, or subsets and variations thereof.

Bus 208 collectively represents all system, peripheral, and chipset buses that communicatively connect the numerous internal devices of router 200. In one or more implementations, bus 208 communicatively connects processing unit(s) 212 with ROM 210, system memory 204, and permanent storage device 202. From these various memory units, processing unit(s) 212 retrieves instructions to execute and data to process in order to execute the processes of the subject disclosure. The processing unit(s) can be a single processor or a multi-core processor in different implementation. ROM 210 stores static data and instructions that are needed by processing unit(s) 212 and other modules of the router 200. Permanent storage device 202, on the other hand, is a read-and-write memory device. This permanent storage device 202 is a non-volatile memory unit that stores instructions and data even when router 200 is off.

The system memory 204 is a read-and-write memory device. However, unlike storage device 202, system memory 204 is a volatile read-and-write memory, such as random access memory. System memory 204 stores any of the instructions and data that processing unit(s) 212 needs at runtime. In one or more implementations, the processes of the subject disclosure are stored in system memory 204, permanent storage device 202, and/or ROM 210. From these various memory units, processing unit(s) 212 retrieves instructions to execute and data to process in order to execute the processes of one or more implementations. The bus 208 also couples router 200 to a network (e.g., 160 of FIG. 1) through network interface 216. The frame processor 218 can create and modify various frames and packets discussed herein. The beamforming module 206 is capable of generating a beamformed frame for transmission to the stations (e.g., 120, 130, 140, or 150 of FIG. 1) via the network interface 216.

In one or more implementations, the network interface 216 transmits an MU PPDU frame to a station (e.g., 120, 130, 140, or 150 of FIG. 1). In response, the network interface 216 receives an ACK frame from the station without transmitting a polling frame to the station prior to receiving the ACK frame from the station.

In some aspects, the network interface 216 may not receive any ACK frame from the stations. Instead, the network interface 216 only receives NACK frames from a station, when the station detects, using an over-the-air detection, that the communication channel between the station and the router 200 is busy or a corresponding signal quality of communication channel is low. The non-transmission of poling and ACK frames can significantly improve the MU-MIMO protocol efficiency.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, flash memory (e.g., SD cards, mini-SD cards, micro-SD cards, etc.), magnetic and/or solid state hard drives, ultra density optical discs, any other storage media. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

While the above discussion primarily refers to microprocessor or multi-core processors that execute software, one or more implementations are performed by one or more integrated circuits, such as application specific integrated circuits (ASICs) or field programmable gate arrays (FPGAs).

In one or more implementations, such integrated circuits execute instructions that are stored on the circuit itself.

Figure 3:
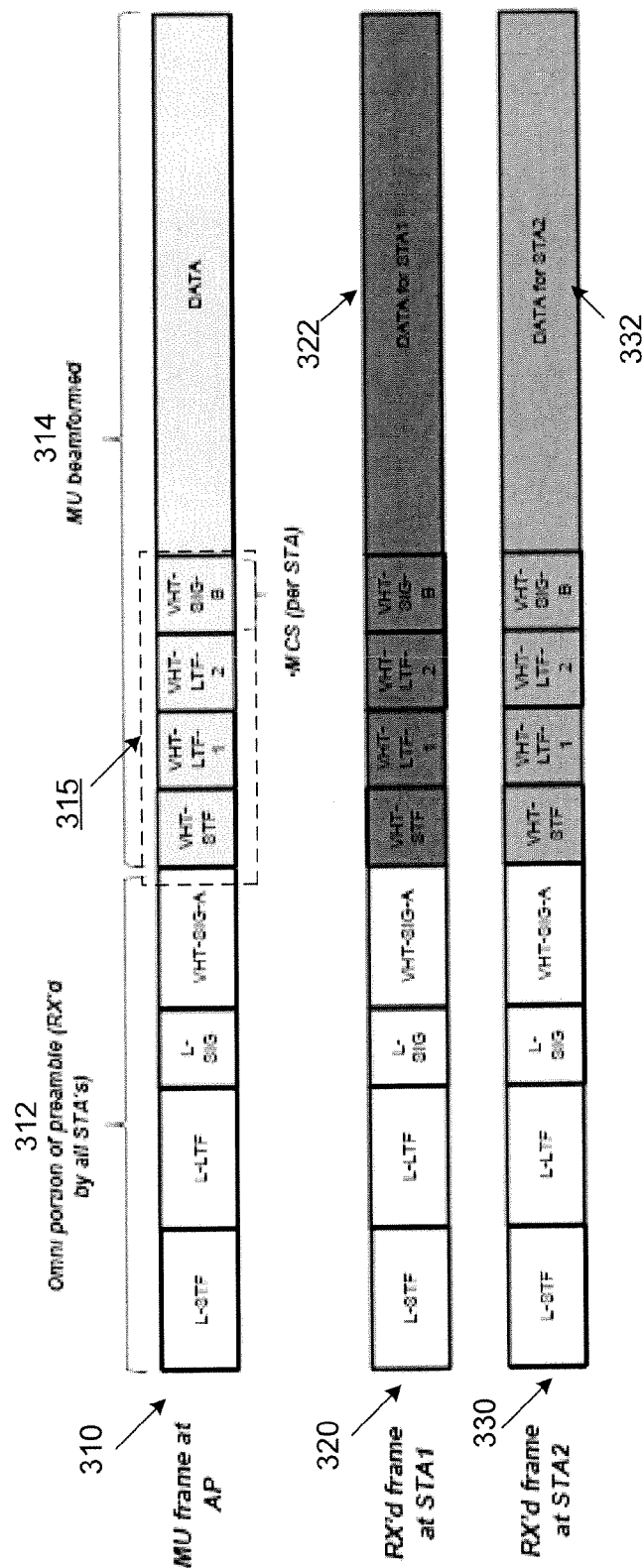
FIG. 3 illustrates an example of MU-frames exchanged between a router and two stations.

FIG. 3 illustrates an example of MU-frames 310, 320, and 330 exchanged between a router and two stations. The router 110 of FIG. 1 (or 200 of FIG. 2) may send the MU frame 310 to stations (e.g., 120, 130, 140, and 150 of FIG. 1). The MU frame 310 includes a preamble with an omni portion 312, which is not beamformed and can be received by all stations. The MU frame 310 further includes a beamformed portion 314, which is for receiving by one or more intended stations only. In other words, with a good choice of beamforming vectors by the beamforming module 206 of FIG. 2, only intended stations can see the beamformed portion 314.

The omni portion 312 may include a number of training fields such as legacy-STF (L-STF), legacy-LTF (L-LTF), legacy-signal (L-SIG), and additional signaling in the form of very-high-throughput SIG-A (VHT-SIG-A) fields, which are defined in the IEEE 802.11ac standard. The L-STF field, for example, may be used by a receiver (e.g., a station) to perform time and frequency synchronization with the signal, so that the rest of the field can be correctly decoded. The station may use the L-LTF field to fine tune timing adjustments after the initial carrier acquisition in the L-STF. The SIG fields include information on the length of the frame. The additional signaling in the MU frame (e.g., the VHT-SIG-A) field indicates whether or not the recipient device of the plurality of the devices has to provide a sounding response in addition to an ACK response The VHT-SIG-A field further includes the channel bandwidth, number of spatial streams, MCS information (e.g., for single-user MIMO) and other data for use in demodulating the frame. This field may be transmitted as 20-MHz symbols, replicated over all underlying 20-MHz channels.

The beamformed portion 314 includes VHT preamble 315 and data fields. The VHT preamble-field 315 includes VHT-STF, VHT-LTF-1, VHT-LTF-2, VHT-SIG-B fields (e.g., sequences). The VHT-STF field is used so that the receiver can normalize the OFDM subcarriers in the subsequent transmission. To allow for non-contiguous 160-MHz channels, the field is repeated in each 80-MHz channel, VHT-LTF fields are included per spatial stream to be used for transmission. For example, the VHT-LTF-1 and VHT-LTF-2 of the frame 310 are for transmission of two spatial streams to two stations. The LTF fields allow the receiver to calculate the multipath characteristics of the channel and apply them to the MIMO algorithm.

The frames 320 and 330 are the frames as received at the two intended stations (e.g., STA1 and STA2) and each include a corresponding data field (e.g., 321 and 332) intended to be received with that station.

FIG. 4A illustrates an example of a MU-MIMO frame exchange. The example MU-MIMO frame exchange of an existing practice, as shown, is between a router (e.g., an access point (AP) such as 200 of FIG. 2, or 110 of FIG. 1) and two MU-MIMO stations (e.g., a first station STA1 and as second station STA2) such as the stations 120, 130, 140 and 150 of FIG. 1. Initially, the router sends an NDP frame 402, in response to which, the first station sends a feedback frame 401-1. The feedback frame 401-1 includes quantized CSI of the communication channel between the router and the first station, which can be used by the router to determine beamforming (BF) vectors that are optimum for the first station. The other stations, for example, the second station do not respond to the NDP frame 402 and wait for a request by a polling frame from the router to send their feedback. For example, the router has to send the polling frame 404-1 to receive the feedback frame 405-1 from the second station.

Following receiving the feedback frame 405-1 from the second station, the router sends the first MU frame 406-1 (e.g., similar to 310 of FIG. 3), in response to which, the first station sends the ACK frame 403-2. The second station, however, waits to receive the polling frame 404-2 from the router before sending the ACK frame 405-2. Similarly, when the router sends the next MU frame 406-2, the first station sends the ACK frame 403-3, whereas, the second station waits for a polling frame 404-3 to be received from the router before responding to it by sending the ACK frame 405-3. The exchange of MU frames, the following polling frame and the ACK frames, as discussed above, repeats until the next sounding (e.g., transmission of another NDP frame by the router). The subject technology improves the above-discussed protocol as described below.

Figure 4C:
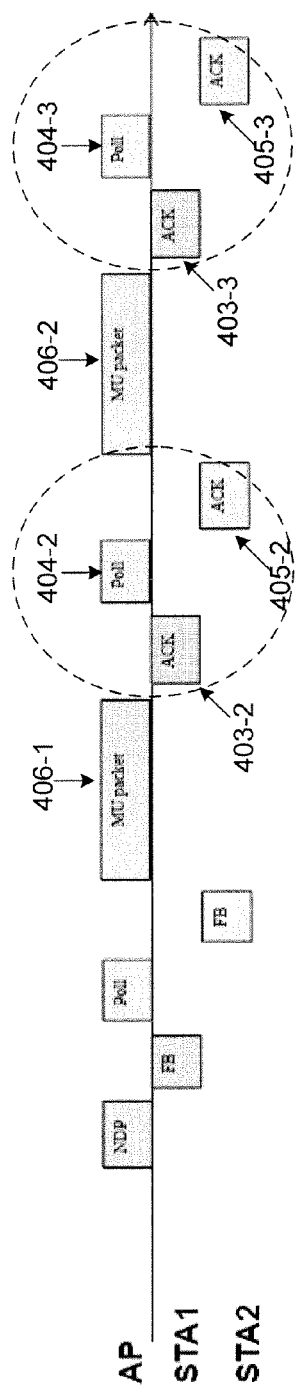
Figure 4D:
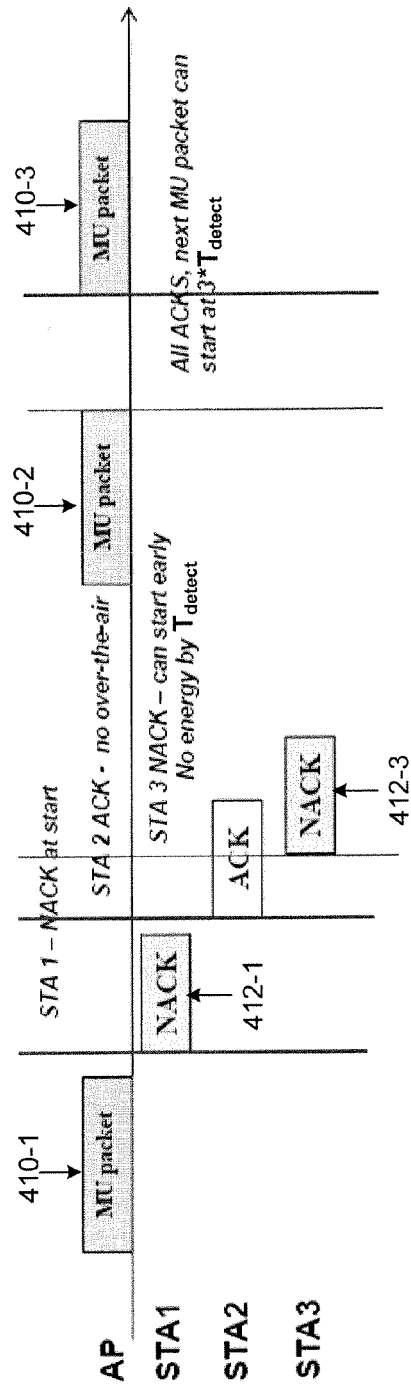

FIGS. 4B, 4C, and 4D illustrate examples of an MU-MIMO frame exchange with improved protocol efficiency in accordance with one or more implementations of the subject technology. In one or more implementations, as shown in FIG. 4B, the protocol efficiency is improved by removing the polling frames 404-2 and 404-3 and the respective subsequent polling frames, before the next sounding by the router, from the frame exchange protocol. In other words, the MU-MIMO stations (e.g., the first station STA1 and second station STA2) respond to MU-PPDU frames in a scheduled fashion one after the other. In some aspects, the MU-MIMO stations can respond with fixed length ACK frames. The router knows the listening periods between the ACK responses and can immediately pick up subsequent ACK frames.

In one or more implementations, the ordering of ACK responses by various MU-MIMO stations is specified by a user ordering in the VHT-SIG-A field of the MU PPDU frame (e.g., 310 of FIG. 3). In some aspects, the first responder (e.g. the MU-MIMO station to respond first) is the station that has a respond-immediately-bit set in a respective MAC header. Otherwise, the first responder is determined based on the user ordering in the VHT-SIG-A field of the MU frame. In some implementations, after the first responder sends its ACK frame the next responder (e.g., according to the user ordering in the VHT-SIG-A field of the MU frame) send its ACK response after a short inter-frame spacing (SIFS) following an end of the ACK frame of the first responder. In other words, each MU-MIMO stations send it ACK frame after a dead airtime (e.g., SIFS) following an end of the ACK frame of the previous responder.

In one or more aspects, each MU-MIMO station is signaled an ACK modulation-and-coding scheme (MCS) frame-length ahead of time. This allows different MU-MIMO stations use different MCSs with different ACK frames. The ACK protocol of the subject technology, as discussed above, can significantly improve efficiency. For example, in case of a three MU-MIMO stations, the timing of the polling frames that can be removed from the protocol can amount to approximately 80 μsec per accumulated MAC protocol data-unit (AMPDU) (e.g., on the order of 1 msec). Consequently, the subject solution can leads to approximately 10% efficiency improvement.

In one or more implementations, as shown in FIG. 4C, the protocol efficiency is improved by having all MU-MIMO stations transmission in sequential order, with each station actively monitoring the over-the-air usage to sequence start of its ACK frame transmission without receiving an explicit polling frame. In other words, each station knows the order of ACK transmission (e.g., from to the user ordering in the VHT-SIG-A field of the MU frame) and waits for an end of transmission of the ACK frame of previous station to start its ACK frame transmission. For example, the polling frames 404-2 and 404-3 are no longer transmitted and after the ACK frames 403-2 and 403-3 are transmitted by the first station in response to the MU frames 406-1 and 406-2, respectively, the second station transmits ACK frames 405-2 and 405-3 following the end of transmission of the ACK frames 403-2 and 403-3. The second station listens and detects the end of transmission of the ACK frames 403-2 and 403-3 of the first station by detecting no over-the-air usage.

In one or more implementations, as shown in FIG. 4D, the protocol efficiency is improved by scheduling immediate transmission of non-ACK (NACK) frames using over-the-air detection to query whether the channel is busy. Transmission of each ACK frame can take approximately 40 μsec, therefore, omitting transmission of ACK frames can improve the MU-MIMO protocol efficiency significantly. It is understood that for the MU-MIMP protocol, due to high signal-to-noise (SNR) environment, the ACK frames are normally going through with quite a high probability (e.g., approximately 90%). Therefore, the ACk response can be implied when no NACK frame is received from a station, and the NACK frames are not highly probable.

Each station, by knowing its order of transmission (e.g., from to the user ordering in the VHT-SIG-A field of the MU frame) can use an all use over-the air detection circuit to query whether the channel is busy and send a NACK frame in response to not correctly receiving the MU frame. For example, in response to not receiving the MU frame 410-1, the first station sends a NACK frame 412-1, and the second station that receives the MU frame 410-1 avoids transmitting an ACK frame. The third station (e.g., STA3), which also fails to receive the MU frame 410-1, send a NACK frame 412-3. The third station can send the NACK frame 412-3 after a detection period ($T_{detect}$) has passed without detecting any over-the-air activity. When the MU frame 410-2 is transmitted by the router, the first, second, and third stations correctly receive the MU frame and no ACk response are transmitted, and the router can transmit the MU frame 410-3 after $3*T_{detect}$ passed the end of the transmission of the MU frame 410-2. Therefore, the subject solution, as disclosed in FIG. 4D, can significantly improve the MU-MIMP protocol efficiency by not requiring the implied ACK responses from the stations.

Figure 5:
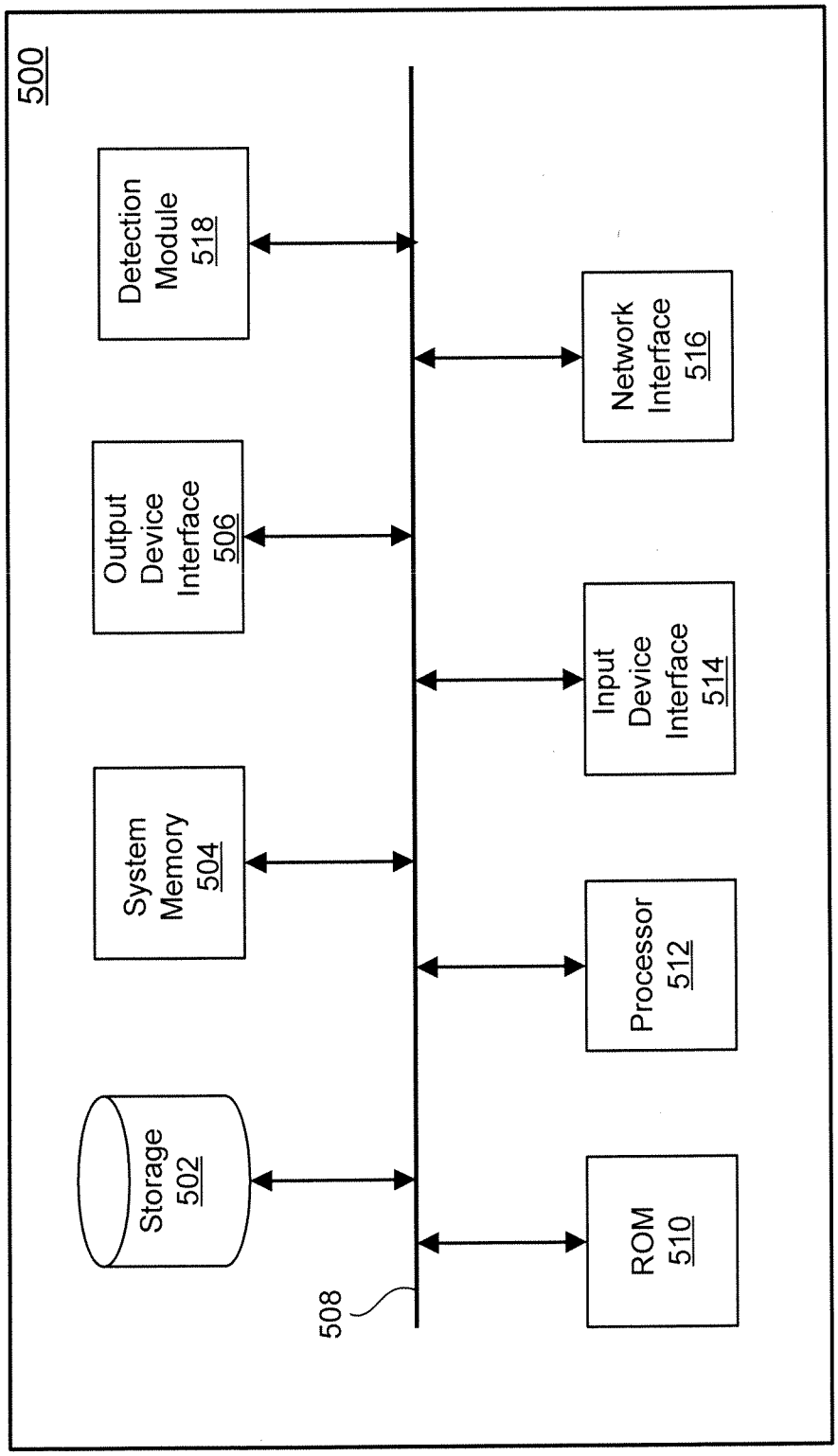
FIG. 5 conceptually illustrates an example of a station in communication with the router of FIG. 2 in accordance with one or more implementations.

FIG. 5 conceptually illustrates an example of a station 500 in communication with the router 200 of FIG. 2 in accordance with one or more implementations of the subject technology. The station 500 can be a hand-held communication device, a tablet computer, a laptop computer, or a desktop computer (e.g., 120, 130, 140, and 150 of FIG. 1), which are in communication with a router (e.g., 110 of FIG. 1). The station 500 can include various types of computer readable media and interfaces for various other types of computer readable media. The station 500 includes a bus 508, a processing unit(s) 512, a system memory 504, a read-only memory (ROM) 510, a permanent storage device 502, an input device interface 514, an output device interface 506, a network interface 516, and a detection module 518, or subsets and variations thereof.

The bus 508 collectively represents all system, peripheral, and chipset buses that communicatively connect the numerous internal devices of router 500. In one or more implementations, the bus 508 communicatively connects the processing unit(s) 512 with the ROM 510, the system memory 504, and the permanent storage device 502. From these various memory units, processing unit(s) 512 retrieves instructions to execute and data to process in order to execute the processes of the subject disclosure. The processing unit(s) can be a single processor or a multi-core processor in different implementations.

The ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when router 500 is off. One or more implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as the permanent storage device 502. Like the permanent storage device 502, the system memory 504 is a read-and-write memory device. However, unlike the storage device 502, the system memory 504 is a volatile read-and-write memory, such as random access memory. The system memory 504 stores any of the instructions and data that the processing unit(s) 512 needs at runtime. In one or more implementations, the processes of the subject disclosure are stored in the system memory 504, the permanent storage device 502, and/or the ROM 510. From these various memory units, the processing unit(s) 512 retrieves instructions to execute and data to process in order to execute the processes of one or more implementations. The bus 508 also connects to the input and output device interfaces 514 and 506. The input device interface 514 enables a user to communicate information and select commands to the electronic system. Input devices used with the input device interface 514 include, for example, alphanumeric keyboards and pointing devices (also called "cursor control devices"). The output device interface 506 enables, for example, the display of images generated by the station 500. The output devices used with output device interface 506 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 508 also couples the detection module 518 to other modules of the station 500. The detection module 518 can detect whether an MU frame transmitted by the router is received or not, and if received, whether the received MU frame is corrupted or not. In response to the detection that the MU frame is not received or a corrupt version of the MU frame is received, the network interface 516 transmits a NACK frame, as discussed above with respect to FIG. 4D. In some aspects, the detection module 518 includes an over-the-air detection circuit. The over-the-air detection circuit can detect over-the-air activity and, for example, report to the network interface 516. For instance, the second and third station STA3 of FIG. 4D can use the over-the-air detection circuit to detect whether there is any signal energy (e.g., transmission activity) associated with a possible NACK response from the second station (e.g., STA2 of FIG. 4D), as discussed above.

Finally, as shown in FIG. 5, the bus 508 also couples the station 500 to a network (e.g., 160 of FIG. 1) through the network interface 516. In this manner, the station 500 can be a part of a network of computers (such as a local area network ("LAN"), a wide area network ("WAN"), or an Intranet, or a network of networks, such as the Internet. Any or all components of the station 500 can be used in conjunction with the subject disclosure.

In some embodiments, the network interface 516 receives an MU PPDU frame (e.g., included in frame 320 of FIG. 3) from a router (e.g., 200 of FIG. 2). The network interface 516 sends, in response to receiving the MU PPDU frame, an ACK response (e.g., an ACK frame) to the router without receiving a polling frame from the router. In some aspects, the network interface 516 may only transmit NACK frames to the router when the detection module 518 detects that the communication channel between the station 500 and the router is busy or of low signal quality, as described above.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Figure 6:
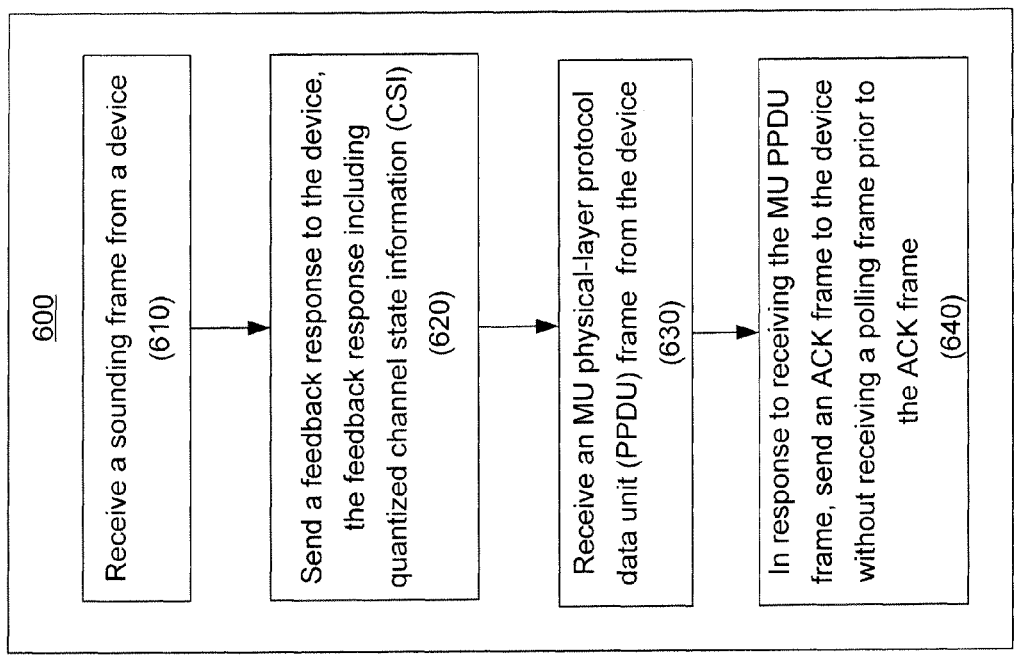
FIG. 6 illustrates an example of a method for frame exchange between a MIMO station and a router with improved protocol efficiency in accordance with one or more implementations.

FIG. 6 illustrates an example of a method 600 for frame exchange between a MIMO station (e.g., 120, 130, 140, or 150 of FIG. 1) and a router (e.g., 110 of FIG. 1) with improved protocol efficiency in accordance with one or more implementations of the subject technology. For explanatory purposes, the blocks of the example method 600 are described herein as occurring in serial, or linearly. However, multiple blocks of the example method 600 can occur in parallel. In addition, the blocks of the example method 600 need not be performed in the order shown and/or one or more of the blocks of the example method 600 need not be performed.

The method 600 includes receiving (e.g., at a station such as 120 of FIG. 1) a sounding frame (e.g., 402 of FIG. 4A) from a device (e.g., router 110 of FIG. 1) (610), sending a feedback response (e.g., 401-1 of FIG. 4A), which includes quantized channel state information (CSI) to the device (620), receiving an MU physical-layer protocol data unit (PPDU) frame (e.g., 406-1 of FIG. 4A) from the device (630), and in response to receiving the MU PPDU frame, sending an ACK frame (e.g., 405-2 of FIG. 4B) to the device without receiving a polling frame (e.g., 404-2 of FIG. 4B) prior to the ACK frame (640).

Figure 7:
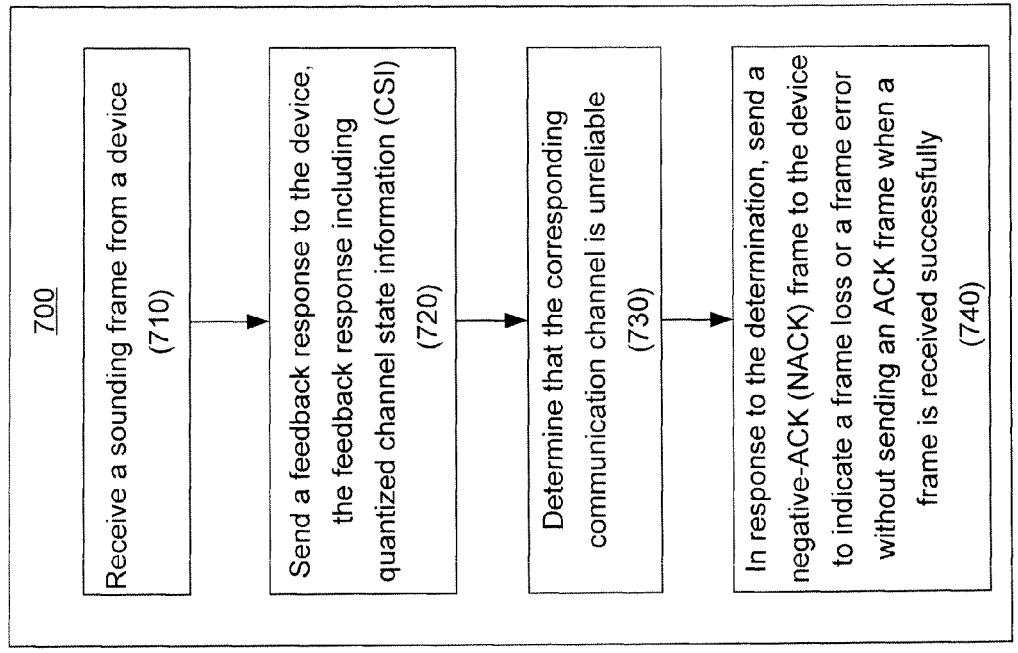
FIG. 7 illustrates an example of a method for frame exchange between a MIMO station and a router with improved protocol efficiency in accordance with one or more implementations.

FIG. 7 illustrates an example of a method 700 for frame exchange between a MIMO station and a router with improved protocol efficiency in accordance with one or more implementations of the subject technology For explanatory purposes, the blocks of the example method 700 are described herein as occurring in serial, or linearly. However, multiple blocks of the example method 700 can occur in parallel. In addition, the blocks of the example method 700 need not be performed in the order shown and/or one or more of the blocks of the example method 700 need not be performed.

The method 700 includes, receiving (e.g., at a station such as 120 of FIG. 1) a sounding frame (e.g., 402 of FIG. 4A) from a device (e.g., 110 of FIG. 1) (710), sending a feedback response (e.g., 401-1 of FIG. 4A) to the device, the feedback response including quantized channel state information (CSI) regarding a corresponding communication channel (720), determining that the corresponding communication channel (e.g., between 120 and 110 of FIG. 1) is unreliable (730), and in response to the determination, sending a negative-ACK (HACK) frame (e.g., 412-1 of FIG. 4D) to the device to indicate a frame loss or a frame error without sending an ACK frame (e.g., 4-03-2 of FIG. 4C) when an MU frame is received successfully (740).

Those of skill in the art would appreciate that the various illustrative blocks, modules, elements, components, and methods described herein can be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans can implement the described functionality in varying ways for each particular application. Various components and blocks can be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect can apply to all configurations, or one or more configurations. An aspect can provide one or more examples of the disclosure. A phrase such as an "aspect" refers to one or more aspects and vice versa. A phrase such as an "embodiment" does not imply that such embodiment is essential to the subject technology or that such embodiment applies to all configurations of the subject technology. A disclosure relating to an embodiment can apply to all embodiments, or one or more embodiments. An embodiment can provide one or more examples of the disclosure. A phrase such an "embodiment" can refer to one or more embodiments and vice versa. A phrase such as a "configuration" does not imply that such configuration is essential to the subject technology or that such configuration applies to all configurations of the subject technology. A disclosure relating to a configuration can apply to all configurations, or one or more configurations. A configuration can provide one or more examples of the disclosure. A phrase such as a "configuration" can refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for improving multiple-user (MU) multiple-input-multiple-output (MIMO) acknowledge (ACK) protocol efficiency, the method comprising:
    receiving a sounding frame from a device;
    sending a feedback response to the device, the feedback response including quantized channel state information (CSI);
    receiving an MU physical-layer protocol data unit (PPDU) frame from the device; and
    in response to detecting that the received MU PPDU frame is corrupt, sending a NACK frame to the device, based on an ordering specified in a very-high throughput (VHT)-SIGA field of the MU PPDU frame, and in response to correctly receiving the MU PPDU frame, refraining from sending an ACK frame to improve the ACK protocol efficiency.

2. The method of claim 1, wherein the device comprises a router, wherein the sounding frame comprises multiple fields including a first field, and wherein the first field comprises a very-high throughput (VHT)-SIGA field.

3. The method of claim 2, wherein receiving the MU PPDU frame and sending the ACK frame is performed by a station of a plurality of target stations, wherein the ordering defines for each station of the plurality of target stations an order based on which each station is expected to send the ACK frame to the device, in response to receiving the MU PPDU frame, and wherein the station comprises a user-equipment including a handheld communication device.

4. The method of claim 3, wherein sending the ACK frame to the device is further based on ACK frame information including a duration time of the ACK frame and a short-interval-frame-spacing (SIFS).

5. The method of claim 4, wherein the ACK frame information is previously obtained from a MAC layer management frame exchange, and wherein the ACK frame information is shared among the device and multiple stations.

6. A method for improving multiple-user (MU) multiple-input-multiple-output (MIMO) acknowledge (ACK) protocol efficiency, the method comprising:
    receiving a sounding frame from a device;
    sending a feedback response to the device, the feedback response including quantized channel state information (CSI) regarding a corresponding communication channel;
    determining that the corresponding communication channel is unreliable;
    in response to the determination that the channel is unreliable, sending, a negative-ACK (NACK) frame to the device to indicate a frame loss or a frame error;
    after sending the NACK frame, correctly receiving an MU physical-layer protocol data unit (PPDU) frame; and
    refraining from sending an ACK frame in response to correctly receiving the MU PPDU frame from the device to improve the ACK protocol efficiency.

7. The method of claim 6, wherein determining that the corresponding communication channel is unreliable comprises determining that a corresponding signal quality of the communication channel is low.

8. The method of claim 6, further comprising successfully receiving an MU physical-layer protocol data unit (PPDU) frame from the device and avoiding responding with an ACK frame to reduce air-time overhead.

9. The method of claim 8, wherein the device comprises a router such as an access point, wherein avoiding responding with the ACK frame leads to an implied received ACK response by the device.

10. The method of claim 6, wherein determining that the corresponding communication channel is unreliable comprises using an over-the-air detection of the communication channel, and wherein sending the NACK frame comprises sending the NACK frame at an earliest possible transmission opportunity.

11. A apparatus with an improved multiple-user (MU) multiple-input-multiple-output (MIMO) acknowledge (ACK) protocol efficiency, the apparatus comprising:
 a processor; and
 a network interface configured to:
  receive a sounding frame from a device;
  send a feedback response to the device, the feedback response including quantized channel state information (CSI);
  receive an MU physical-layer protocol data unit (PPDU) frame from the device; and
  in response to detecting that the received MU PPDU frame is corrupt, send a NACK frame to the device, based on an ordering specified in a very-high throughput (VHT)-SIGA field of the MU PPDU frame, in response to correctly receiving the MU PPDU frame, refrain from sending an ACK frame to improve the ACK protocol efficiency.

12. The apparatus of claim 11, wherein the device comprises a router, wherein the sounding frame comprises multiple fields including a first field, and wherein the first field comprises a very-high throughput (VHT)-SIGA field.

13. The apparatus of claim 11, wherein the apparatus comprises a station of a plurality of target stations, wherein the station of the plurality of target stations comprises a user-equipment including a handheld communication device.

14. The apparatus of claim 12, wherein the ordering defines, for each station of the plurality of target stations, an order based on which each station is expected to send the ACK frame to the device, in response to receiving the MU PPDU frame.

15. The apparatus of claim 12, wherein the network interface is configured to send the ACK frame to the device based on ACK frame information including a duration time of the ACK frame and a short-interval-frame-spacing (SIFS), wherein the ACK frame information is previously obtained from a MAC layer management frame exchange, and wherein the network interface is configured share the ACK frame information with multiple stations.

16. A apparatus with an improved multiple-user (MU) multiple-input-multiple-output (MIMO) acknowledge (ACK) protocol efficiency, the apparatus comprising:
 a network interface configured to:
  receive a sounding frame from a device; and
  send a feedback response to the device, the feedback response including quantized channel state information (CSI) regarding a corresponding communication channel; and
 a detection module to determine that the corresponding communication channel is unreliable;
 wherein the network interface is configured to:
  send, in response to the determination, a negative-ACK (NACK) frame to the device to indicate a frame loss or a frame error;
  after sending the NACK frame, correctly receive an MU physical-layer protocol data unit (PPDU) frame; and
  refrain from sending an ACK frame in response to correctly receiving the MU PPDU frame from the device to improve the ACK protocol efficiency.

17. The apparatus of claim 16, wherein the detection module is configured to determine that the corresponding communication channel is unreliable by determining that a corresponding signal quality of communication channel is low.

18. The apparatus of claim 16, wherein the network interface is configured to avoid responding with an ACK frame, when successfully receiving an MU physical-layer protocol data unit (PPDU) frame from the device, in order to reduce air-time overhead.

19. The apparatus of claim 18, wherein the device comprises a router such as an access point, wherein avoiding responding with the ACK frame leads to an implied received ACK response by the device.

20. The apparatus of claim 16, wherein the detection module is configured to determine that the corresponding communication channel is unreliable by using an over-the-air detection of the communication channel, and wherein sending the NACK frame comprises sending the NACK frame at an earliest possible transmission opportunity.

* * * * *